Figure 1:
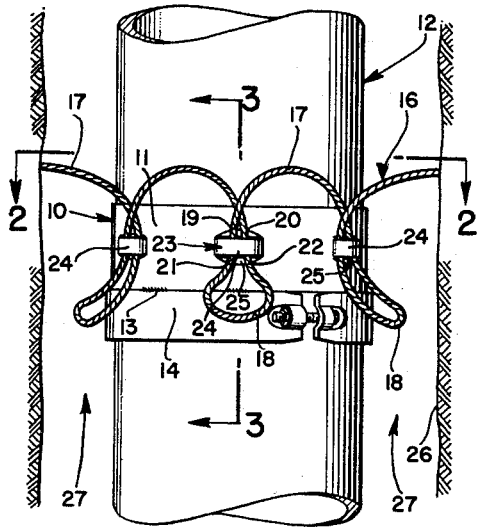

Nov. 5, 1963

J. R. SOLUM ETAL 3,109,491

TOOL FOR USE IN CEMENTING WELL CASING

Original Filed Sept. 6, 1960

3 Sheets-Sheet 1

JAMES R. SOLUM
WILLIAM C. HEMPEL
CONRAD R. SOLUM, JR.
*INVENTORS*

BY *Lyon + Lyon*

ATTORNEYS

Nov. 5, 1963　　　J. R. SOLUM ETAL　　　3,109,491
TOOL FOR USE IN CEMENTING WELL CASING
Original Filed Sept. 6, 1960　　　3 Sheets-Sheet 2
FIG. 5.
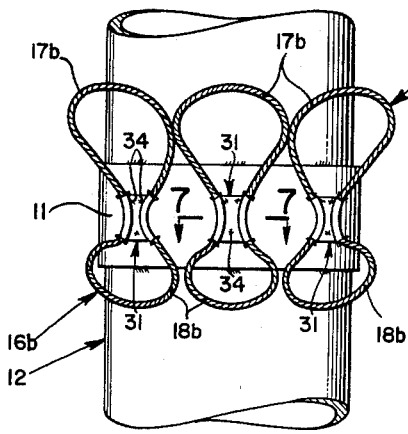
FIG. 6.
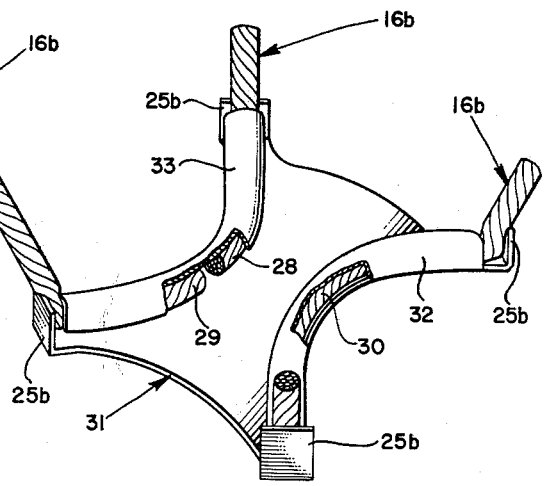
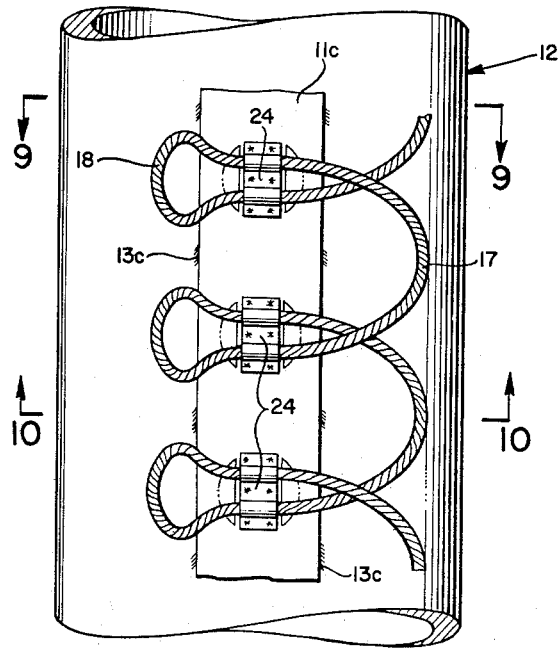
FIG. 8.
FIG. 7.
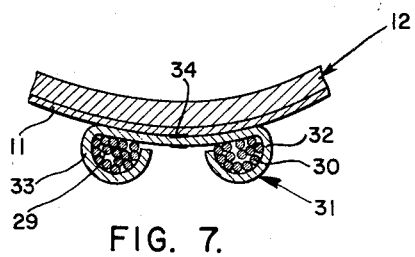
JAMES R. SOLUM
WILLIAM C. HEMPEL
CONRAD R. SOLUM, JR.
*INVENTORS*
BY *Lyon & Lyon*
ATTORNEYS

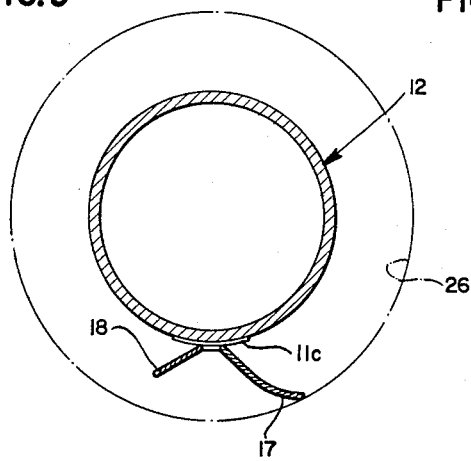
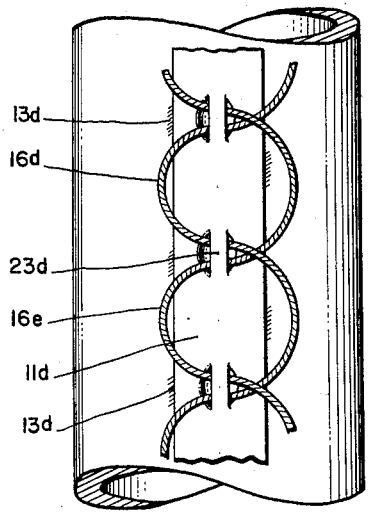
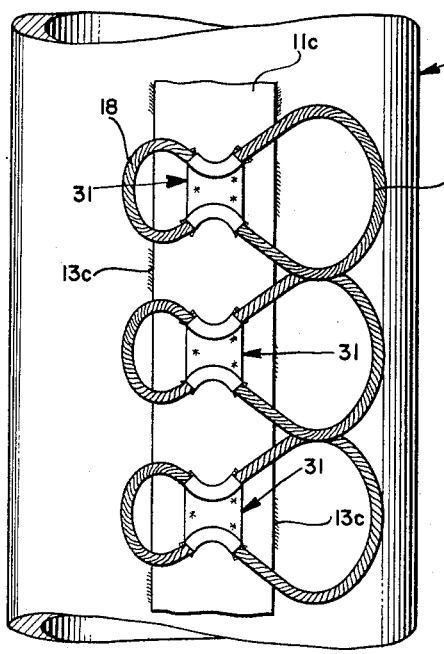
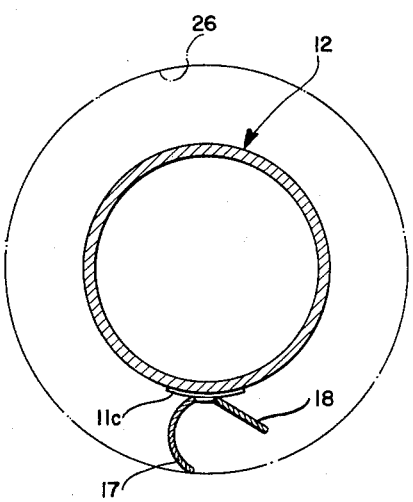

3,109,491
TOOL FOR USE IN CEMENTING WELL CASING
James R. Solum, Los Angeles, and William C. Hempel and Conrad R. Solum, Jr., Manhattan Beach, Calif., assignors to B & W Incorporated, Torrance, Calif., a corporation of California
Original application Sept. 6, 1960, Ser. No. 54,313, now Patent No. 3,074,483, dated Jan. 22, 1963. Divided and this application July 16, 1962, Ser. No. 219,091
5 Claims. (Cl. 166—172)

This invention relates to apparatus for use in completion of oil wells and is particularly directed to improvements over devices of the type shown in Wright Patent No. 2,881,840. This application is a division of application Serial No. 54,313, filed September 6, 1960, now United States Patent No. 3,074,483.

In the completion of oil wells it is conventional practice to place cement in the annular space between well pipe and wall of the formation. It is highly desirable to obtain a cement bond of optimum quality between the casing and the formation to facilitate subsequent completion operations and to prevent failures. In order to obtain such a cement bond it is necessary to displace all or nearly all of the drilling mud from the annular space during the cementing process.

At present it is common practice to use well scratchers mounted on the well pipe to abrade the walls of the well formation to remove any deposited drilling mud so that the cement can form a bond with the walls of the well formation. However in some instances it becomes less desirable to effect an actual abrading on the walls of the well formation, but it is still highly desirable to displace all of the drilling mud with cement in the annular space.

In normal practice, circulation is maintained before the cementing by pumping the drilling mud down the inside of the well casing to the bottom of the hole and up the annular space between the well casing and the walls of the formation to the surface. However all of the drilling mud in the annular space is not put in motion by such pumping and on the contrary the fluid flow establishes a channeling through the static drilling mud in the annular space. If the cement is pumped in under these conditions it too assumes the channeling condition previously established and consequently the drilling mud in the annular space is not completely displaced by cement as desired.

In order to displace the drilling mud completely with the cement the mud must be completely fluid and totally in motion. If sufficient turbulence is created within the drilling mud it will all be in motion. Such turbulence can be created by sufficiently high pumping velocities, but this is impossible under conventional practice. Turbulence can also be created in the mud within the annular space by placing devices on the outer surface of the casing and either rotating or reciprocating the casing so that such devices pass through substantially all of the annular space. The agitation caused by the movement of such devices reduces the static or gelled drilling mud to a fluid state capable of being displaced by the cement.

Accordingly it is the principal object of this invention to provide an improved form of cementing tool for creating turbulence in the annular space containing the mud column.

Another object of this invention is to provide a turbulence generator which will be highly effective for the least amount of rotation or reciprocation of the well pipe.

Another object is to provide a well tool which is adapted both to contact the walls of the formation and to create turbulence in the annular space.

Another object is to provide a turbulence generator which may comprise multiple strand flexible wire cable mounted so as to establish pairs of turbulence generating elements.

Another object is to provide a well tool device of this type which can be manufactured with a minimum cost and is particularly adapted to stand severe treatment and use.

Another object is to provide a well tool device of this type which is comprised of a minimum number of lengths of multiple strand flexible wire cable thereby facilitating assembly by minimizing both the number of pieces to be handled and cut ends of cable which tend to become frayed and difficult to assemble.

Other and more detailed objects and advantages will appear hereinafter.

Figure 2:
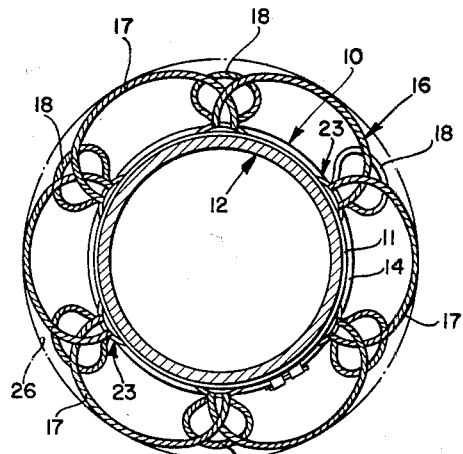
Figure 4:
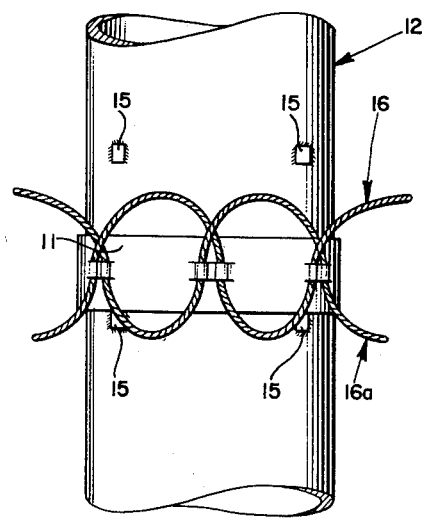
Figure 3:
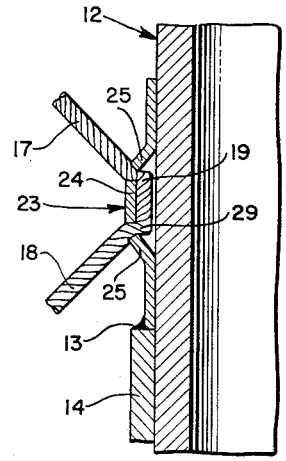

In the drawings:
FIGURE 1 is an elevation view showing the well tool device constituting a preferred embodiment of our invention.
FIGURE 2 is a sectional view taken substantially on the line 2—2 as shown in FIGURE 1.
FIGURE 3 is an enlarged detail of a sectional view taken substantially on the line 3—3 as shown in FIGURE 1.
FIGURE 4 is a view similar to FIGURE 1 showing a modification.
FIGURE 5 shows a second modification.
FIGURE 6 is an enlarged view of the retainer shown in FIGURE 5.
FIGURE 7 is a sectional view taken substantially on line 7—7 as shown in FIGURE 5.
FIGURE 8 shows a fragmentary length of a well tool device constituting a third modification, the carrier comprising a longitudinal strip instead of a collar.
FIGURE 9 is a sectional view taken substantially on line 9—9 as shown in FIGURE 8, showing the tool installed in one position.
FIGURE 10 is a sectional view taken substantially on line 10—10 as shown in FIGURE 8, showing the tool installed in an inverted position.
FIGURE 11 shows another modification, the carrier comprising a longitudinal strip instead of a collar.
FIGURE 12 shows another modification, the carrier comprising a longitudinal strip instead of a collar.

Referring to the drawings, the turbulence generating device generally designated 10 includes a carrier sleeve 11 which may be fixed to the well casing or well pipe 12 by any convenient means, for example, weld metal 13 fixing the device to a stop collar 14 which is in turn secured to the pipe by conventional means.

Elements which extend into the annular space outside the casing are formed of a continuous length of multiple strand flexible wire cable 16 in the form of an upper loop 17 and a lower loop 18 as shown in the drawings. The upper loop 17 has base portions 19 and 20 secured to the carrier sleeve 11. The lower loop 18 has base portions 21 and 22 also secured to the carrier sleeve 11. The upper loop 17 being in the form of an arch with its base portions 19 and 20 relatively separated and overlapping each adjacent upper loop 17 and the lower loop 18 having its base portions 21 and 22 in close proximity.

A securing device generally designated 23 consisting of a bridge element 24 and locking tabs 25 which secure the cable 16 to the carrier sleeve 11. The bridge element 24 is lanced from the sheet material from the carrier sleeve 11 and the cable is inserted in a manner so as to provide loops 17 and 18 on the exterior of the carrier sleeve 11. The locking tabs 25 are lanced from the material of the carrier sleeve 11 and bent to a position as shown in FIGURE 3. The locking tabs serve to secure the base portions 19, 20, 21, and 22 of the loops to the carrier sleeve 11 and to cause the loops to extend outwardly from the carrier sleeve 11, by mashing the multiple strand wire cable 16 between the bridge element 24 and said locking tabs 25. The upper loop 17 being of sufficient magnitude and properly directed to engage the surrounding wall 26 of the well bore. A lower loop 18 being so positioned as to extend into the annular space 27 without contacting the surrounding wall 26 when the well pipe 12 is centered within the surrounding wall 26.

In the modified form of our invention shown in FIGURE 4, two lengths of multiple strand wire cable 16 and 16a are used rather than only one. Furthermore each length of cable alternately forms an arched shape loop above and below the carrier sleeve 11. In this manner a more comprehensive coverage of the annular space 27 is obtained with use of a minimum additional amount of cable. Stop lugs 15 are welded on either side of the carrier sleeve 11 to illustrate an optional method of mounting the device to the well pipe.

In the modified form of our invention shown in FIGURE 5, the length of multiple strand wire cable 16b is relatively shorter than either of the other forms of our invention and each cable length 16b forms only one upper loop 17b and one lower loop 18b. Furthermore the manner of securing the cable lengths 16b to the carrier is different. The cable ends 28 and 29 of each cable length 16b and the intermediate segment 30 of cable length 16b are all secured in a retainer generally designated 31 by mechanically forming segments 32 and 33 of retainer 31 around the intermediate segment 30 and cable ends 28 and 29 respectively. Furthermore the cable loops are forced to project outwardly from the carrier sleeve by means of locking tabs 25b formed integrally from the material of retainer 31. The retainer 31 is fixed to the carrier sleeve 11 by any convenient means, for example spot or projection weld 34. The cost of manufacturing is reduced to a minimum by separating the operations of handling and forming the cable loops which is done with the retainer, and the fixing of the loop to the carrier sleeves.

The modified form of our invention shown in FIGURES 8 and 11 are variations of the devices shown in FIGURES 1 and 5 respectively in which the cable is mounted on a carrier strip 11c rather than a carrier sleeve 11 and in which the turbulence is generated by rotation rather than reciprocation of the well pipe 12. The carrier strip 11c is fixed to the well pipe 12 by any convenient means for example weld metal 13c.

FIGURES 9 and 10 reveal that the devices shown in FIGURES 8 and 11 can be mounted with the larger loops extending either to the right or left. Furthermore the well pipe 12 can be rotated in either direction with the devices so mounted.

The modified form of our invention shown in FIGURE 12 is a variation of the device shown in FIGURE 4 with the cables mounted on a carrier strip 11d rather than a carrier sleeve 11. Two separate links of cables 16d and 16e are threaded through spaced securing devices 23b of the type of device 23 illustrated in FIGURE 1 and form arched loops extending to the left and right of the carrier strip. Carrier strip 11d is secured to the casing by any convenient means such as welds 13d. As with the modified forms of our invention shown in FIGURES 8 and 11, the modified form of FIGURE 12 generates turbulence by rotation rather than reciprocation of the well pipe.

It should be observed that in our preferred form and all the modified forms of our invention there are pairs of loops formed of flexible cable with one loop of each pair relatively larger than the other. Further the general cable configuration and means of mounting the cable on the carrier are the same for a sleeve type carrier or a longitudinal strip type carrier when the circumference of the sleeve type carrier is considered as corresponding to the longitudinal length of the strip type carrier.

Having fully described our invention, it is to be understood we do not wish to be limited to the detail herein set forth, but our invention is of the full scope of the appended claims.

We claim:

1. In a device of the class described for generating turbulence in a mobile mixture existing in the annular space between a well pipe and a surrounding wall upon reciprocation of the well pipe relative to the surrounding wall, said device adapted to be mounted on the outer surface of the well pipe, the combination of: a carrier sleeve, a plurality of securing devices circumferentially spaced on said carrier sleeve, a continuous length of multiple strand wire cable mounted at each successive securing device and extending generally outwardly from the well pipe forming arched loops, every other loop alternately extending upwardly and downwardly, a second continuous length of multiple strand wire cable mounted at each of the same said successive securing devices and extending generally outwardly from the well pipe forming arched loops, every other loop alternately extending upwardly and downwardly with each upwardly extending loop of one continuous cable length being directly above each downwardly extending loop of the other continuous cable length.

2. In a device of the class described for generating turbulence in a mobile mixture existing in the annular space between a well pipe and a surrounding wall upon reciprocation of the well pipe relative to the surrounding wall, said device adapted to be mounted on the outer surface of the well pipe, the combination of: a carrier sleeve, a plurality of securing devices circumferentially spaced on said carrier sleeve, a continuous length of multiple strand wire cable mounted at each successive securing device and extending generally outwardly from the well pipe forming arched loops, every other loop alternately extending upwardly and downwardly, a second continuous length of multiple strand wire cable mounted at each of the same said successive securing devices and extending generally outwardly from the well pipe forming arched loops, every other loop alternately extending upwardly and downwardly with each upwardly extending loop of one continuous cable length being directly above each downwardly extending loop of the other continuous cable length, and the upwardly extending loops in overlapping relation having base portions positioned between the base portions of each adjacent upwardly extending loop.

3. In a device of the class described for generating turbulence in a mobile mixture existing in the annular space between a well pipe and a surrounding wall upon reciprocation of the well pipe relative to the surrounding wall, said device adapted to be mounted on the outer surface of the well pipe, the combination of: a carrier sleeve, a plurality of securing devices circumferentially spaced on said carrier sleeve, a continuous length of multiple strand wire cable mounted at each successive securing device and extending generally outwardly from the well pipe forming arched loops, every other loop alternately extending upwardly and downwardly, a second continuous length of multiple strand wire cable mounted at each of the same said successive securing devices and extending generally outwardly from the well pipe forming arched loops, every other loop alternately extending upwardly and downwardly with each upwardly extending loop of one continuous cable being directly above each downwardly extending loop of the other continuous cable, and the upwardly extending loops in overlapping relation having base portions of each upwardly extending loop positioned between the base portions of each adjacent upwardly extending loop, and each said upwardly directed loop extending outwardly from the well pipe to contact the surrounding wall, and each said downwardly directed loop being relatively smaller and extending outwardly from the well pipe to a position within the said annular space and terminating without contacting the surrounding wall.

4. In a device of the class described for generating turbulence in a mobile mixture existing in the annular space between a well pipe and a surrounding wall upon rotation of the well pipe relative to the surrounding wall, said device adapted to be mounted on the outer surface of the well pipe, the combination of: a carrier strip, a plurality of longitudinally spaced securing devices, two continuous lengths of multiple strand wire cable mounted to said carrier strip by means of said securing devices, and each cable length alternately forming arched loops to the right and to the left of said carrier strip, and the base portion of each loop being positioned in successive securing devices, and each loop extending to the right formed by one continuous cable length between two securing devices being laterally positioned opposite each loop extending to the left formed by the other continuous cable length between the same two securing devices, and locking tabs formed integrally with the securing devices to force the loop portions of the cable lengths to project outwardly from the well pipe.

5. The combination defined in claim 4 in which all the loops extending either right or left are relatively larger than the loops extending the opposite direction, and said larger loops are of sufficient magnitude to engage the surrounding wall, and said smaller loops project into the said annular space without engaging said surrounding wall.

References Cited in the file of this patent

UNITED STATES PATENTS

| | | |
|---|---|---|
| 2,826,253 | Wright | Mar. 11, 1958 |
| 2,881,840 | Wright | Apr. 14, 1959 |
| 3,074,483 | Solum | Jan. 22, 1963 |